United States Patent
Weber et al.

[15] 3,678,033
[45] July 18, 1972

[54] 7-NITRO-1H-1, 5-BENZODIAZEPINE-2,4-(3H,5H)-DIONES

[72] Inventors: Karl-Heinz Weber, Gau-Algesheim; Adolf Bauer; Herbert Merz, both of Ingelheim, Rhine; Klaus Minck, Gau-Algesheim, all of Germany

[73] Assignee: Boehringer Ingelheim GmbH, Ingelheim, Rhine, Germany

[22] Filed: Feb. 2, 1971

[21] Appl. No.: 112,070

[30] Foreign Application Priority Data

Feb. 13, 1970 Germany.....................P 20 06 601.7

[52] U.S. Cl..........................260/239.3 B, 424/244, 424/263
[51] Int. Cl. ........................................................C07d 53/04
[58] Field of Search............................................260/239.3 B

[56] References Cited

OTHER PUBLICATIONS

Buchi et al., " Helv. Chim Acta" Vol. 39, pp. 957– 964 (1956)

Primary Examiner—Henry R. Jiles
Assistant Examiner—Robert T. Bond
Attorney—Hammond & Littell

[57] ABSTRACT

Compounds of the formula

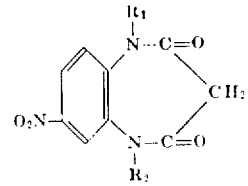

wherein
$R_1$ is hydrogen, straight or branched alkyl of one to four carbon atoms, hydroxy-(alkyl of one to four carbon atoms), methoxy-(alkyl of one to four carbon atoms), acetoxy-(alkyl of one to four carbon atoms), cyclopropyl-methyl, cyclohexyl or allyl, and
$R_2$ is hydrogen, phenyl, o-halo-phenyl, o-trifluoromethyl-phenyl, o-nitro-phenyl, o-cyano-phenyl or pyridyl,
provided, however, that $R_1$ and $R_2$ are other than both hydrogen at the same time; the compounds are useful as psychosedatives and anticonvulsives.

10 Claims, No Drawings

7-NITRO-1H-1,5-BENZODIAZEPINE-2,4-(3H,5H)-DIONES

This invention relates to novel 7-nitro-1H-1,5-benzodiazepine-2,4-(3H,5H)-diones, as well as to a method of preparing these compounds.

More particularly, the present invention relates to a novel class of compounds represented by the formula

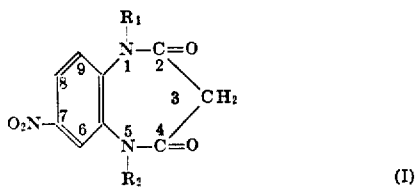

(I)

wherein $R_1$ is hydrogen, straight or branched alkyl of one to four carbon atoms, hydroxy-(alkyl of one to four carbon atoms), methoxy-(alkyl of one to four carbon atoms), acetoxy-(alkyl of one to four carbon atoms), cyclopropyl-methyl, cyclohexyl or allyl, and $R_2$ is hydrogen, phenyl, o-halo-phenyl, o-trifluoromethyl-phenyl, o-nitro-phenyl, o-cyano-phenyl or pyridyl, provided, however, that $R_1$ and $R_2$ are other than both hydrogen at the same time.

The compounds of the formula I above may be prepared by oxidizing a benzodiazepinone of the formula

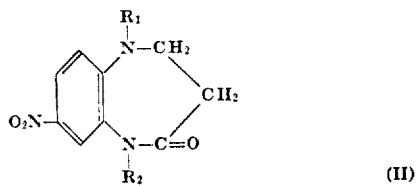

(II)

wherein $R_1$ and $R_2$ have the same meanings as in formula I, with a strong oxidizing agent in the presence of an inert organic solvent.

A mixture of chromic acid and sulfuric acid is preferably used as the oxidizing agent, but potassium permanganate or activated manganese dioxide may also be successfully employed.

For the oxidation with chromic acid/sulfuric acid or potassium permanganate, suitable inert organic solvents are particularly those which are water-miscible and do not themselves undergo oxidation under the prevailing reaction conditions, such as acetone, methyl ethyl ketone, glacial acetic acid, dioxane, tetrahydrofuran or mixtures of any two or more of these.

For the oxidation with activated manganese dioxide, not only the solvents mentioned in the preceding paragraph, but also ethyl acetate, diethyl ether, methylene chloride or chloroform may be employed.

The optimum oxidation reaction temperature depends largely upon the particular starting compound which is used, and generally varies between 20°C and the boiling point of the selected solvent medium.

For the preparation of a compound of the formula I wherein $R_1$ is hydroxy-alkyl, it is advantageous to start from a corresponding 1-acylalkyl-2,3,4,5-tetrahydro-1H-1,5-benzodiazepin-4-one and to split off the acyl group by conventional methods subsequent to the oxidation.

A compound of the formula I wherein $R_1$ is hydrogen may, if desired, be subsequently alkylated in conventional manner.

The above-described oxidation reaction proceeds rapidly and smoothly and with high yields of the desired end products; some of the starting compounds of the formula can even be oxidized into the corresponding end products of the formula I in a few minutes at room temperature. This fact is unobvious and surprising. Thus, it is well known that 2,3-dihydro-1,4-benzodiazepines can be oxidized into the corresponding 2,3-dihydro-1,4-benzodiazepin-2-ones [see R.J. Freyer et al., J. Org. Chem. 30, 1308 et seq. (1965)], but the yields are very poor; for instance, the yield of 7-nitro-5-phenyl-2,3-dihydro-2H-1,4-benzodiazepin-2-one from 7-nitro-5-phenyl-2,3-dihydro-1,4-benzodiazepine is only 2.4 percent. On the other hand, it is also well known that 1,5-benzodiaze-pines are extremely sensitive to hydrolysis and readily undergo ring cleavage or ring condensation into imidazoles under acid conditions [see J.A.C.S. 66, 1810 (1910)]. Consequently, the expectation would necessarily have been that oxidation in a strong acid medium would also alter the ring structure of 1,5-benzodiazepin-2-ones in the indicated sense and/or produce poor yields. We have unexpectedly discovered that this is not the case.

The following examples further illustrate the present invention and will enable others skilled in the art to understand it more completely. It should be understood, however, that the invention is not limited solely to the particular examples given below.

EXAMPLE 1

7-Nitro-5-phenyl-1H-1,5-benzodiazepin-2,4-(3H,5H)-dione

Sixty-five gm (0.23 mol) of 7-nitro-5-phenyl-2,3,4,5-tetrahydro-1H-1,5-benzodiazepin-4-one (m.p. 241°C) were dissolved in 2,000 ml of acetone, and then 120 ml of an oxidizing solution, prepared from 40 gm $CrO_3$, 38 ml $H_2SO_4$ and 150 ml $H_2O$, were added dropwise over a period of 15 minutes, whereby the internal temperature of the mixed solution rose. After all of the oxidizing solution had been added, the reaction mixture was stirred for 20 minutes, and the liquid phase was decanted from the precipitated chromium salts and concentrated to about 300 ml by evaporation. The concentrated solution was poured into 500 ml of water, and the aqueous mixture was briefly brought to the boiling point and was then placed on an ice bath to allow the reaction product to crystallize out. 63.5 gm (92 percent of theory) of the compound of the formula

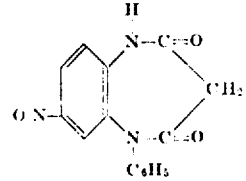

having a melting point of 272°-274°C (recrystallized from acetonitrile) were obtained.

EXAMPLE 2

Using a procedure analogous to that described in Example 1, 27.6 gm (88 percent of theory) of 1-methyl-5-phenyl-7-nitro-1H-1,5-benzodiazepine-2,4-(3H,5H)-dione, m.p. 178°-180°C, of the formula

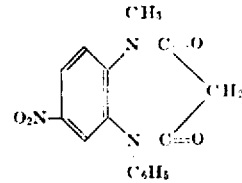

were obtained from 29.7 gm (0.1 mol) of 1-methyl-5-phenyl-7-nitro-1H-2,3,4,5-tetrahydro-1,5-benzodiazepin-4-one (m.p. 123°-125°C).

EXAMPLE 3

Using a procedure analogous to that described in Example 1, 29.4 gm (90 percent of theory) of 1-ethyl-5-phenyl-7-nitro-1H-1,5-benzodiazepine-2,4-(3H,5H)-dione, m.p. 257°-259°C, were obtained from 31.1 gm (0.1 mol) of 1-ethyl-5-phenyl-7-nitro-1H-2,3,4,5-tetrahydro-1,5-benzodiazepin-4-one (m.p. 160°-162°C).

EXAMPLE 4

Using a procedure analogous to that described in Example 1, 28.0 gm (82 percent of theory) of 1-isopropyl-5-phenyl-7- nitro-1H-1,5-benzodiazepine-2,4-(3H,5H)-dione, m.p. 212°-213°C, were obtained from 32.5 gm (0.1 mol) of 1-isopropyl-5-phenyl-7-nitro-1H-2,3,4,5-tetrahydro-1,5-benzodiazepin-4-one (m.p. 170°-171°C).

EXAMPLE 5

Using a procedure analogous to that described in Example 1, 25.4 gm (75 percent of theory) of 1-allyl-5-phenyl-7-nitro-1H-1,5-benzodiazepine-2,4-(3H,5H)-dione, m.p. 237°-239°C, of the formula

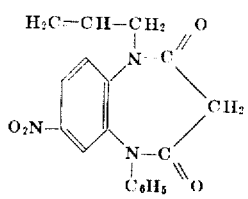

were obtained from 32.3 gm (0.1 mol) of 1-allyl-5-phenyl-7-nitro-1H-2,3,4,5-tetrahydro-1,5-benzodiazepin-4-one (m.p. 126°-127°C).

EXAMPLE 6

1-Methyl-7-nitro-5-phenyl-1H-1,5-benzodiazepine-2,4-(3H,5H)-dione

Five gm (0.017 mol) of 1-methyl-7-nitro-5-phenyl-2,3,4,5-tetrahydro-1H-1,5-benzodiazepine-4-one (m.p. 123°-125°C) were suspended in 100 ml of tetrahydrofuran, 15 gm of activated manganese dioxide were added to the suspension, and the resulting mixture was refluxed for 15 hours. Thereafter, the reaction mixture was vacuum-filtered, and the filtrate was partially evaporated in vacuo and worked up as described in Example 1. 2.1 gm (40 percent of theory) of 1-methyl-7-nitro-5-phenyl-1H-1,5-benzodiazepine-2,4-(3H,5H)-dione, m.p. 178°-180°C, were obtained.

EXAMPLE 7

1-Methyl-7-nitro-5-phenyl-1H-1,5-benzodiazepine-2,4-(3H,5H)-dione

Forty gm (0.13 mol) of 5-phenyl-7-nitro-1H-1,5-benzodiazepine-2,4-(3H,5H)-dione were suspended in 600 ml of tetrahydrofuran and caused to go into solution by addition of 6.4 gm of an aqueous 50 percent sodium hydride suspension. Thereafter, 8.5 ml of methyl iodide were added to the solution, the mixture was stirred for 1 hour at 45°C, then an additional 8.5 ml of methyl iodide were added, and the mixture was again stirred for 1 hour. Subsequently, a few drops of glacial acetic acid were added to the reaction solution which was then evaporated, the residue was taken up in methylene chloride, the resulting solution was washed with water and then dried, the methylene chloride was evaporated, and the residue was recrystallized from methylene chloride/diisopropyl ether. Thirty-five gm of 1-methyl-7-nitro-5-phenyl-1H-1,5-benzodiazepine-2,4-(3H,5H)-dione, m.p. 179°-181°C, were obtained.

EXAMPLE 8

1-(β-Hydroxy-ethyl)-7-nitro-5-phenyl-1H-1,5-benzodiazepine-2,4-(3H,5H)-dione

Twenty gm (0.07 mol) of 7-nitro-5-phenyl-1H-1,5-benzodiazepine-2,4-(3H,5H)-dione were suspended in 600 ml of methanol; 10 ml of water, 1 ml of Triton B (35 percent solution of benzyl trimethylammonium hydroxide in methanol) and 50 ml of ethyleneoxide were added to the suspension, and the mixture was stirred at room temperature until a clear solution was formed, which occurred after about 50 hours. Thereafter, the solution was evaporated to dryness, the residue was taken up in methylene chloride, the resulting solution was extracted several times with water, the organic phase was dried and then evaporated, and the residue was recrystallized from ethanol. Eleven gm of the compound of the formula

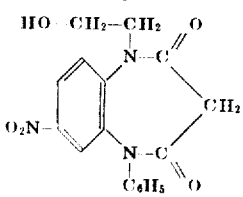

having a melting point of 187°-188°C were obtained.

EXAMPLE 9

Using a procedure analogous to that described in Example 1, 5-(o-chloro-phenyl)-7-nitro-1H-1,5-benzodiazepine2,4-(3H,5H)-dione, m.p. 250°-252°C, of the formula

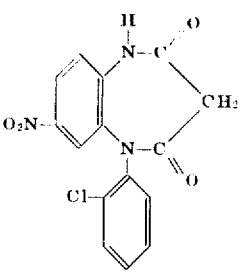

was obtained from 5-(o-chloro-phenyl)-7-nitro-1-2,3,4,5-tetrahydro-1,5-benzodiazepin-4-one.

EXAMPLE 10

Using a procedure analogous to that described in Example 1, 1-n-propyl-5-phenyl-7-nitro-1H-1,5-benzodiaze-pine-2,4-(3H,5H)-dione, m.p. 239°-241°C, was obtained from 1-n-propyl-5-phenyl-7-nitro-1H-2,3,4,5-tetrahydro-1,5-benzodiazepin-4-one.

EXAMPLE 11

Using a procedure analogous to that described in Example 1, 5-(o-fluoro-phenyl)-7-nitro-1H-1,5-benzodiazepine-2,4-(3H,5H)-dione, m.p. 260°-263°C, of the formula

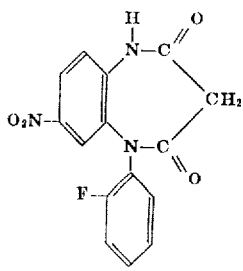

was obtained from 5-(o-fluoro-phenyl)-7-nitro-1H-2,3,4,5-tetrahydro-1,5-benzodiazepin-4-one.

EXAMPLE 12

Using a procedure analogous to that described in Example 1, 1-methyl-5-(o-fluoro-phenyl)-7-nitro-1H-1,5-benzodiazepine-2,4-(3H,5H)-dione, m.p. 113°-115°C (decomp.; recrystallized from methanol with one mol of methanol of crystallization), was obtained from 1-methyl-5-(o-fluoro-phenyl)-7-nitro-1H-2,3,4,5-tetrahydro-1,5-benzodiazepin-4-one.

EXAMPLE 13

Using a procedure analogous to that described in Example 1, 1-n-butyl-5-(o-fluoro-phenyl)-7-nitro-1H-1,5-benzodiazepine-2,4-(3H,5H)-dione, m.p. 164°-166°C, was obtained from 1-n-butyl-5-(o-fluoro-phenyl)-7-nitro-1H-2,3,4,5-tetrahydro-1,5-benzodiazepin-4-one.

EXAMPLE 14

Using a procedure analogous to that described in Example 1, 5-(o-nitro-phenyl)-7-nitro-1H-1,5-benzodiazepine-2,4-(3H,5H)-dione, m.p. 285°–286°C, of the formula

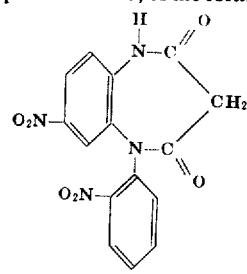

was obtained from 5-(o-nitro-phenyl)-7-nitro-1H-2,3,4,5-tetrahydro-1,5-benzodiazepin-4-one.

EXAMPLE 15

Using a procedure analogous to that described in Example 1, 1-allyl-5-(o-nitro-phenyl)-7-nitro-1H-1,5-benzo-diazepine-2,4-(3H,5H)-dione, m.p. 158°–160°C, was obtained from 1-allyl-5-(o-nitro-phenyl)-7-nitro-1H-2,3,4,5-tetrahydro-1,5-benzodiazepin-4-one.

EXAMPLE 16

Using a procedure analogous to that described in Example 1, 1-ethyl-5-(o-nitro-phenyl)-7-nitro-1H-1,5-benzo-diazepine-2,4-(3H,5H)-dione, m.p. 226°–228°C, was obtained from 1-ethyl-5-(o-nitro-phenyl)-7-nitro-1H-2,3,4,5-tetrahydro-1,5-benzodiazepin-4-one.

EXAMPLE 17

Using a procedure analogous to that described in Example 1, 1-isopropyl-5-(o-nitro-phenyl)-7-nitro-1H-1,5-benzodiazepine-2,4-(3H,5H)-dione, m.p. 240°–242°C, was obtained from 1-isopropyl-5-(o-nitro-phenyl)-7-nitro-1H-2,3,4,5-tetrahydro-1,5-benzodiazepin-4-one.

EXAMPLE 18

Using a procedure analogous to that described in Example 1, 5-(o-trifluoromethyl-phenyl)-7-nitro-1H-1,5-benzodiazepine-2,4-(3H,5H)-dione, m.p. 118°C (decomp.; recrystallized from ethanol with one mol of ethanol of crystallization), of the formula

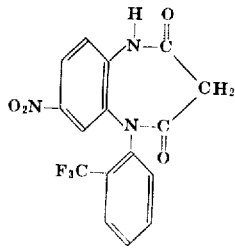

was obtained from 5-(o-trifluoromethyl-phenyl)-7-nitro-1H-2,3,4,5-tetrahydro-1,5-benzodiazepin-4-one.

EXAMPLE 19

Using a procedure analogous to that described in Example 1, 1-methyl-5-(2'-pyridyl)-7-nitro-1H-1,5-benzodiazepine-2,4-(3H,5H)-dione, m.p. 176°–177°C, of the formula

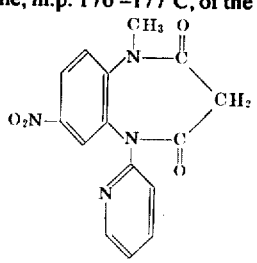

was obtained from 1-methyl-5-(2'-pyridyl)-7-nitro-1H-2,3,4,5-tetrahydro-1,5-benzodiazepin-4-one.

EXAMPLE 20

Using a procedure analogous to that described in Example 1, 1-methyl-7-nitro-1H-1,5-benzodiazepine-2,4-(3H,5H)-dione, m.p. 230°–231°C, of the formula

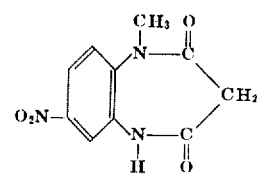

was obtained from 1-methyl-7-nitro-1H-2,3,4,5-tetrahydro-1,5-benzodiazepin-4-one.

EXAMPLE 21

Using a procedure analogous to that described in Example 1, 1-(cyclopropyl-methyl)-5-phenyl-7-nitro-1H-1,5-benzodiazepine-2,4-(3H,5H)-dione, m.p. 280°–281°C, of the formula

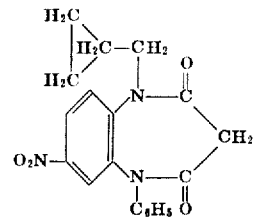

was obtained from 1-(cyclopropyl-methyl)-5-phenyl-7-nitro-1H-2,3,4,5-tetrahydro-1,5-benzodiazepin-4-one.

The compounds according to the present invention, that is, those embraced by formula I above, have useful pharmacodynamic properties. More particularly, the compounds of the instant invention exhibit very effective psychosedative (tranquilizing) and anticonvulsive activities in warm-blooded animals, such as mice, rats, minks, cats, dogs. Particularly effective are those compounds of the formula I wherein $R_1$ is hydrogen, methyl, β-hydroxy-ethyl or allyl, and $R_2$ is phenyl, o-substituted phenyl or α-pyri-dyl.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 0.84 mgm/kg body weight, preferably 0.083 to 0.42 mgm/kg body weight, and the daily dose rate is from 0.166 to 2.5 mgm/kg body weight.

The following examples illustrate a few dosage unit compositions comprising a compound of the present invention as an active ingredient and represent the best modes contemplated of putting the invention into practical use. The parts are parts by weight unless otherwise specified.

EXAMPLE 22

Coated pills

The pill core composition is compounded from the following ingredients:

| | | |
|---|---:|---:|
| 1-Methyl-5-phenyl-7-nitro-1H-1,5-benzodiazepine-2,4-(3H,5H)-dione | | 5.0 parts |
| Lactose | | 28.5 parts |
| Corn starch | | 15.0 parts |
| Gelatin | | 1.0 parts |
| Magnesium stearate | | 0.5 parts |
| | Total | 50.0 parts |

Preparation:

The benzodiazepine compound is intimately admixed with the lactose and the corn starch, the mixture is moistened with an aqueous 10 percent solution of the gelatin, and the moist mass is granulated through a 1 mm-mesh screen, dried at 40°C and again passed through the screen. The resulting dry granulate is admixed with the magnesium stearate, and the mixture is compressed into 50 mgm-pill cores which are then coated with a thin shell consisting essentially of a mixture of talcum and sugar, and the coated pills are polished with beeswax. Each pill contains 5.0 mgm of the benzodiazepine compound and is an oral dosage unit composition with effective tranquilizing and anticonvulsive action.

EXAMPLE 23

Tablets

The tablet composition is compounded from the following ingredients:

| | | |
|---|---:|---:|
| 5-Phenyl-7-nitro-1H-1,5-benzodiazepine-2,4-(3H,5H)-dione | | 3.0 parts |
| Lactose | | 50.0 parts |
| Corn starch | | 32.0 parts |
| Soluble starch | | 4.0 parts |
| Magnesium stearate | | 1.0 parts |
| | Total | 90.0 parts |

Preparation:

The benzodiazepine compound and the magnesium stearate are intimately admixed with each other, the mixture is moistened with an aqueous 10 percent solution of the soluble starch, the moist mass is granulated through a 1 mm-mesh screen, the granulate is dried and then intimately admixed with the lactose and the corn starch, and the finished composition is compressed into 90 mgm-tablets. Each tablet contains 3 mgm of the benzodiazepine compound and is an oral dosage unit composition with effective tranquilizing and anticonvulsive action.

EXAMPLE 24

Suppositories

The suppository composition is compounded from the following ingredients:

| | | |
|---|---:|---:|
| 1-Allyl-5-phenyl-7-nitro-1H-1,5benzodiazepine-2,4-(3H,5H)-dione | | 5.0 parts |
| Cocoa butter | | 1695.0 parts |
| | Total | 1700.0 parts |

Preparation:

The finely pulverized benzodiazepine compound is stirred with the aid of an immersion homogenizer into the cocoa butter which has previously been melted and cooled to 40°C, and 1,700 mgm-portions of the mixture are poured at 35°C into cooled suppository molds. Each suppository contains 5.0 mgm of the benzodiazepine compound and is a rectal dosage unit composition with effective tranquilizing and anticonvulsive action.

EXAMPLE 25

Hypodermic solution

The solution is compounded from the following ingredients:

| | | |
|---|---:|---:|
| 1-(β-Hydroxy-ethyl)-5-phenyl-7-nitro-1H-1,5-benzodiazepine-2,4-(3H,5H)-dione | | 2.0 parts |
| Sodium chloride | | 18.0 parts |
| Distilled water | q.s.ad | 2000.0 parts by vol. |

Preparation:

The benzodiazepine compound and the sodium chloride are dissolved in a sufficient amount of distilled water, and the solution is diluted with additional distilled water to the indicated volume, filtered until free from suspended particles, and filled under aseptic conditions into 2 cc-ampules which are finally sterilized for 20 minutes at 120°C and then sealed. The solution in each ampule contains 2 mgm of the benzodiazepine compound and is an injectable dosage unit composition with effective tranquilizing and anticonvulsive action.

Analogous results are obtained when any one of the other benzodiazepine-diones embraced by formula I is substituted for the particular benzodiazepine-dione in Examples 22 through 25. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

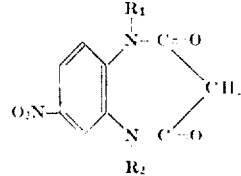

wherein $R_1$ is hydrogen, alkyl of one to four carbon atoms, hydroxy-(alkyl of one to four carbon atoms), methoxy-(alkyl of one to four carbon atoms), acetoxy-(alkyl of one to four carbon atoms), cyclo-propyl-methyl, cyclohexyl or allyl, and $R_2$ is hydrogen, phenyl, o-halo-phenyl, o-trifluoro-methyl-phenyl, o-nitro-phenyl, o-cyano-phenyl or pyridyl, provided, however, that $R_1$ and $R_2$ are other than both hydrogen at the same time.

2. A compound according to claim 1, wherein $R_1$ is hydrogen, alkyl of one to four carbon atoms, hydroxy-ethyl, allyl or cyclopropyl-methyl, and $R_2$ is hydrogen, phenyl, o-chloro-phenyl, o-fluoro-phenyl, o-nitro-phenyl, o-trifluoromethyl-phenyl or α-pyridyl, provided, however, that $R_1$ and $R_2$ are other than both hydrogen at the same time.

3. A compound according to claim 2, which is 1-methyl-5-phenyl-7-nitro-1H-1,5-benzodiazepine-2,4-(3H,5H)-dione.

4. A compound according to claim 1, wherein $R_1$ is hydrogen, methyl, β-hydroxy-ethyl or allyl, and $R_2$ is phenyl, o-chloro-phenyl, o-fluoro-phenyl, o-nitro-phenyl, o-trifluoromethyl-phenyl or α-pyridyl.

5. A compound according to claim 2, which is 5-phenyl-7-nitro-1H-1,5-benzodiazepine-2,4-(3H,5H)-dione.

6. A compound according to claim 2, which is 1-(β-hydroxy-ethyl)-5-phenyl-7-nitro-1H,1,5-benzodiazepine-2,4-(3H,5H)-dione.

7. A compound according to claim 2, which is 1-methyl-5-(o-fluoro-phenyl)-7-nitro-1H-1,5-benzodiazepine-2,4-(3H,5H)-dione.

8. A compound according to claim 2, which is 1-methyl-5-(2'-pyridyl)-7-nitro-1H-1,5-benzodiazepine-2,4-(3H,5H)-dione.

9. The process of preparing a compound according to claim 1, which consists of oxidizing a compound of the formula

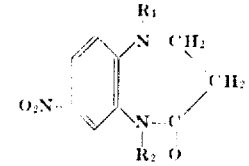

wherein $R_1$ and $R_2$ have the same meanings as in claim 1, with a strong oxidizing agent in the presence of an inert, non-oxidizable organic solvent at a temperature between 20°C and the boiling point of said solvent, and recovering the oxidation product.

10. The process according to claim 9, wherein said strong oxidizing agent is selected from the group consisting of potassium permanganate, activated manganese dioxide and mixtures of chromic acid and sulfuric acid.

* * * * *

UNITED STATES PATENT OFFICE
CERTIFICATE OF CORRECTION

Patent No. 3,678,033               Dated July 18, 1972

Inventor(s) KARL-HEINZ WEBER, ADOLF BAUER, HERBERT MERZ and KLAUS MINCK

It is certified that error appears in the above-identified patent and that said Letters Patent are hereby corrected as shown below:

Col. 2, line 38   correct the formula to read

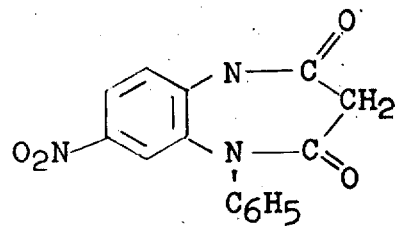

Col. 4, line 28   correct "1-2,3,4,5-" to read --1H-2,3,4,5- --

Signed and sealed this 13th day of March 1973.

(SEAL)
Attest:

EDWARD M. FLETCHER, JR.
Attesting Officer

ROBERT GOTTSCHALK
Commissioner of Patents